(12) United States Patent
Krebs et al.

(10) Patent No.: US 11,208,301 B2
(45) Date of Patent: Dec. 28, 2021

(54) CONTROL SWITCH, CONTROL SYSTEM AND METHOD FOR OPERATING A CRANE

(71) Applicant: Konecranes Global Corporation, Hyvinkää (FI)

(72) Inventors: Wolfgang Krebs, Wetter (DE); Thomas Lindenau, Haltern am See (DE); Frederick Woidneck, Wetter (DE); Marco Woldt, Bochum (DE); Giuliano Persico, Wetter (DE); Holger Freitag, Bochum (DE); Stefan Elspass, Tönisvorst (DE)

(73) Assignee: Konecranes Global Corporation, Hyvinkää (FI)

( * ) Notice: Subject to any disclaimer, the term of this patent is extended or adjusted under 35 U.S.C. 154(b) by 56 days.

(21) Appl. No.: 16/614,304

(22) PCT Filed: May 14, 2018

(86) PCT No.: PCT/EP2018/062380
§ 371 (c)(1),
(2) Date: Nov. 15, 2019

(87) PCT Pub. No.: WO2018/210750
PCT Pub. Date: Nov. 22, 2018

(65) Prior Publication Data
US 2020/0361752 A1    Nov. 19, 2020

(30) Foreign Application Priority Data
May 17, 2017   (DE) .......................... 102017110715.0

(51) Int. Cl.
*B66C 13/40*    (2006.01)
*H04W 4/80*     (2018.01)
(Continued)

(52) U.S. Cl.
CPC .............. *B66C 13/40* (2013.01); *B66C 13/44* (2013.01); *G08C 17/02* (2013.01); *G08C 19/00* (2013.01);
(Continued)

(58) Field of Classification Search
CPC ......... B66C 13/40; B66C 13/44; B66C 17/00; B66C 2700/088; G08C 17/02; G08C 17/04; G08C 19/00; G08C 2201/93; H04W 4/80
See application file for complete search history.

(56) References Cited

U.S. PATENT DOCUMENTS

| | | | |
|---|---|---|---|
| 2013/0065577 A1* | 3/2013 | Ceresoli .................. | B66C 13/44 455/419 |
| 2016/0246322 A1* | 8/2016 | Ehrensperger ......... | G05G 9/047 |

(Continued)

FOREIGN PATENT DOCUMENTS

| | | |
|---|---|---|
| CN | 1037125 A | 11/1989 |
| CN | 204917718 U | 12/2015 |

(Continued)

OTHER PUBLICATIONS

English translation of the International Preliminary Examination Report from corresponding Patent Cooperation Treaty (PCT) Application No. PCT/EP2018/062380, dated Sep. 30, 2019.

(Continued)

*Primary Examiner* — Omeed Alizada
(74) *Attorney, Agent, or Firm* — Gardner Linn

(57) ABSTRACT

A control switch for operating a crane. The control switch includes a first interface designed to transfer signals between the control switch and a control unit of the crane. In order to combine, in particular, the robustness and operating reliability of the control switch desired in industrial use with increased functional scope in a cost-effective way, the con- (Continued)

trol switch is provided with a second interface designed to transfer signals between a mobile terminal and the control switch in order to add functions of the mobile terminal to the functional scope of the control switch.

16 Claims, 2 Drawing Sheets

(51) Int. Cl.
  *B66C 13/44* (2006.01)
  *G08C 17/02* (2006.01)
  *G08C 19/00* (2006.01)
  *B66C 17/00* (2006.01)
(52) U.S. Cl.
  CPC ............... *H04W 4/80* (2018.02); *B66C 17/00* (2013.01); *B66C 2700/088* (2013.01); *G08C 2201/93* (2013.01)

(56) References Cited

U.S. PATENT DOCUMENTS

| 2018/0186386 A1* | 7/2018 | Jovenall | G10L 15/26 |
| 2019/0206274 A1* | 7/2019 | Jovenall | B60T 13/665 |
| 2019/0291759 A1* | 9/2019 | Trang | B61L 27/0077 |

FOREIGN PATENT DOCUMENTS

| DE | 202006017729 | 4/2008 |
| DE | 102009051819 | 6/2010 |
| DE | 102012010721 | 12/2013 |
| DE | 102013006258 | 10/2014 |
| DE | 102014216982 | 3/2016 |
| EP | 2168903 | 3/2010 |
| EP | 2489625 | 8/2012 |
| KR | 101715351 | 3/2017 |
| WO | WO2017072281 | 5/2017 |

OTHER PUBLICATIONS

International Search Report and Written Opinion of the International Searching Authority from corresponding Patent Cooperation Treaty (PCT) Application No. PCT/EP2018/062380, dated Aug. 23, 2018.

International Preliminary Examination Report from corresponding Patent Cooperation Treaty (PCT) Application No. PCT/EP2018/062380, dated Sep. 30, 2019.

* cited by examiner

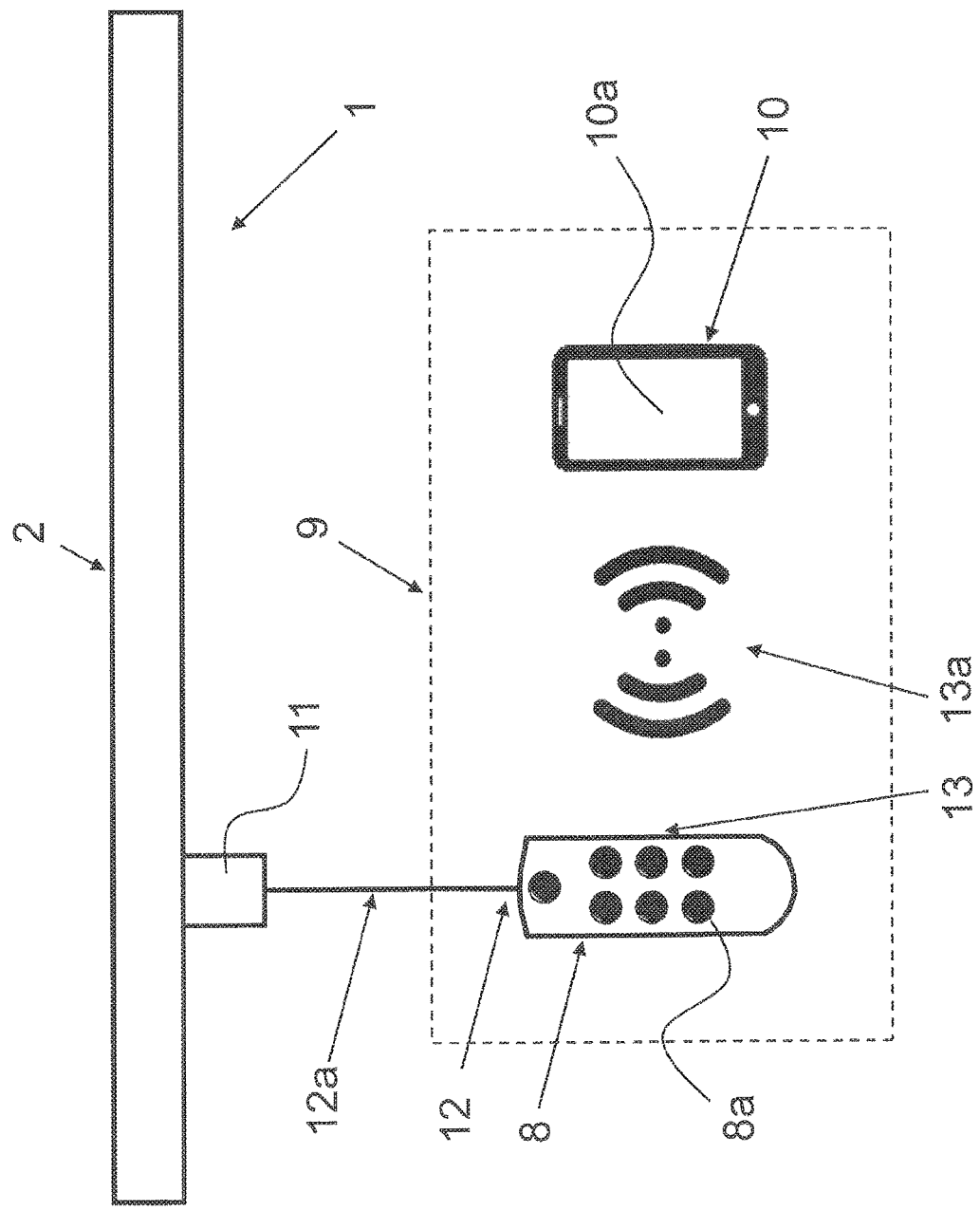

US 11,208,301 B2

CONTROL SWITCH, CONTROL SYSTEM AND METHOD FOR OPERATING A CRANE

CROSS REFERENCE TO RELATED APPLICATIONS

The present application is a § 371 national stage of International Application PCT/EP2018/062380, filed May 14, 2018, which claims priority benefit of German Pat. Application DE 10 2017 110 715.0, filed May 17, 2017.

FIELD OF THE INVENTION

The invention relates to a control system, in particular a crane control system, for operating a crane. The invention also relates to a method for operating a crane comprising such a control system.

BACKGROUND

In practice, cranes are used mostly for lifting and lowering loads at mutually different locations within the working area of the cranes. Alternatively or in addition to occupying a crane operator's cabin, cranes are operated mostly by actuating a control switch that can be connected by cables, such as in the form of a pendant control switch, or can be wireless.

DE 20 2006 017 729 U1 discloses a radio control system for controlling the functions of a crane, which comprises a first hand-held apparatus that is also referred to as a hand-held transmitter. The first hand-held apparatus has a first interface that serves to transmit signals between the first hand-held apparatus and at least one master part connected to a crane controller. Moreover, the first hand-held apparatus comprises a second interface that serves to transmit signals of the first hand-held apparatus with a second hand-held apparatus. As a result, it is possible that, of the two mutually connected hand-held apparatuses, one or a plurality of functions of one hand-held apparatus is/are assumed by the other hand-held apparatus.

In addition to conventional physical operating elements that are to be actuated mechanically, e.g. resiliently mounted buttons or push-buttons, rotary controllers or sliding controllers and latching or non-latching switches, operating panels having a touch-sensitive surface are being used increasingly for operating apparatuses and machines. The operating panels, in the form of touchscreens that are mostly intuitively operable, are already being used as standard in tablet computers and smartphones. Their display screen that can be modified in terms of its visual output of purely virtual operating elements e.g. in the form of graphical buttons, permits the selection of an almost unlimited number of extremely different functions. Furthermore, e.g. any operating data can also be shown at the same time or by toggling, the data providing a basis for inputs and settings that are possibly to be effected or for monitoring.

For instance, DE 10 2012 010 721 A1 discloses a machine control device for a machine, such as e.g. a crane, which permits control of the crane by means of a data connection to a portable operating part. The portable operating part can be a smartphone or a tablet computer, via which a person operates the crane directly and without any additional specific operating elements.

Furthermore, DE 10 2014 216 982 A1 discloses a control system for a technical installation, such as e.g. a crane, which comprises a control unit of the installation and a control switch. The control system has a first interface that is designed for transmitting signals between the control switch and the control unit. Above and beyond the operation of the installation by means of the control switch, provision is made that the control unit can be connected to a mobile hand-held apparatus in a signal-transmitting manner. The hand-held apparatus can be e.g. a smartphone or a tablet computer. The bypassing of the control switch, which then occurs in this case, means that the installation can be controlled via the mobile hand-held apparatus that is directly connected to its control unit.

A similar control system for operating a chain hoist is known from KR 101 715 351 B1 because even in this case a smartphone can be used for operating the chain hoist, which can be connected to a control unit of the chain hoist in parallel with the control switch and therefore bypasses the control switch of the chain hoist in terms of the signal transmission thereof.

In addition to the obvious advantages of touchscreens, daily usage in particular in the working area of cranes places increased requirements on their durability.

Therefore, commercially available, mobile devices are rather unsuitable for completely replacing a control switch. In contrast, the use of devices designed specifically to meet industrial requirements is associated with correspondingly high costs. Also, completely dispensing with a control switch can reduce the operating security in particular when performing standard inputs because the absence of conventional, physical operating elements, which are to be actuated mechanically, occasionally impairs haptics and can thus increase the risk of operating errors. Finally, the integration of touchscreens, which can be implemented per se without any problem in control switches can, on two fronts, result in economical disadvantages demonstrated by increased production costs and reduced product cycles. Therefore, in view of these considerations, there is certainly still room for improvement in control switches and control systems for cranes.

WO 2017/072 281 A1 describes that a mobile hand-held terminal can be used in order to control the movement of articulated arms of an industrial robot in addition to a handle-like movement specification means.

DE 10 2013 006 258 A1 discloses a crane that comprises a control device and a mobile target signal transmitter and position determination means corresponding thereto. They are used for automatically determining a respectively current position of the target signal transmitter by means of a transponder arranged in or on the target signal transmitter, where the drive devices of the crane are activated such that its load hook can be moved automatically towards the mobile target signal transmitter. The target signal transmitter can be integrated into a portable operating unit, such as e.g. a radio remote controller.

DE 10 2009 051 819 A1 discloses a security system for a control switch of a crane in order to ensure that the crane is operated solely by an authorised person.

EP 2 168 903 A1 describes a multifunctional apparatus, which is connected to the crane for remote maintenance and remote control thereof, the apparatus being connected to a base station in a signal-transmitting manner via a wireless interface.

A method for operating a mobile crane is known from EP 2 489 625 A1.

SUMMARY OF THE INVENTION

The crane control system of the present invention cost-effectively combines the robustness and operating security of the control switch required in industrial usage with an increased functional scope of the mobile computing device and software embedded therein. In accordance with an aspect of the invention, the arrangement of an additional, second interface on the control switch of the control system is proposed, which is designed to establish a communication connection for transmitting signals between the mobile device and the control switch in order thereby to be able to extend the functional scope of the control switch with functions of the mobile device. The advantage resulting from this is seen in the option of additional coupling and integration of the mobile device, by means of which the functional scope of the control switch can be increased almost arbitrarily. In other words, the functional scope can thus be extended by means of the mobile device. In particular, the functional scope of the mobile device thus differs from the functional scope of the control switch. Accordingly, not only the mobile device itself but in particular also the second interface between the control switch and the mobile device is designed for transmitting signals, by means of which the functional scope of the control switch can be extended with functions of the mobile device. Furthermore, by essentially maintaining the control switch, it can be used e.g. for standard operation of the crane. Furthermore, owing to the arrangement of the physical operating elements of the control switch that cannot be modified and helps with familiarisation, the operator is able to use the control switch virtually with his eyes shut. In combination with a robust structure of the control switch, a high degree of operating security is thus maintained.

By means of the inventive possibility for coupling a mobile device to the control switch, it is now possible to supplement physically present operating elements of the control switch with buttons that can be shown on the mobile device. In this manner, the functional scope of the control switch, which is limited per se, can be extended by additional possibilities of the mobile device for operating a crane. Alternatively or in addition thereto, the mobile device can be used in order to display, change (for example) relevant parameters of the crane, and/or to retrieve any instructions and aids stored in a database.

Within the scope of the invention, a signal-transmitting connection or a transmission of signals, via the respective communication connection, is understood to be the possibility of exchanging in a digital and/or analogue manner at least one item of information. For example, information exchanged between the communicatively connected control unit, control switch and mobile device may include at least control signals, operating data, state data, parameters, images, and/or sound data.

According to another development of the basic inventive concept, the control switch is designed to permit signals to be transmitted between a mobile device and the control unit via the first interface and the second interface. This means that, in practical use, a signal-transmitting connection between the mobile device and the control unit is established preferably exclusively with quasi interpositioning of the control switch and thus via the control switch. In this case, the mobile device uses the first interface of the control switch and the communication connection established thereby between the control unit and the control switch, as well as the second interface of the control switch and the communication connection established thereby between the control switch and the mobile device in order to establish a signal-transmitting connection with the control unit.

According to another development of the basic inventive concept, the first interface that is provided for transmitting signals between the control switch and the control unit is designed for transmitting signals wirelessly, e.g. by radio. Alternatively or in addition thereto, the second interface that is provided for transmitting signals between a mobile device and the control switch is designed for transmitting signals wirelessly. Wireless signal transmissions allow otherwise necessary physical lines to be omitted, which allows rapid assembly and disassembly, as well as cost-effective production. Moreover, such wireless connections are not subject to wear or any damage because of cable breakage or severing.

According to an alternative embodiment of the invention, the first interface, which is provided for transmitting signals between the control switch and the control unit, can be designed for establishing a wired communication connection and the transmission of signals effected thereby. Alternatively or in addition thereto, the second interface that is provided for transmitting signals between a mobile device and the control switch can of course also be designed for establishing a wired communication connection and the transmission of signals effected thereby. Such wired communication connections have advantages in particular where, with regard to wireless communication connections, interference can occur and/or the environment hinders the range thereof. Possible interference is considered to be that which either can hinder the transmission of signals or can influence further installations or parts of installations.

According to another embodiment of the invention, the second interface and the associated communication connection are designed for transmitting signals between the mobile device and the control switch by means of the transmission standard of near field communication or NFC for short. On account of its design, such a connection is already provided for the contactless exchange of data effected exclusively over short distances. By reason of the effective range of this transmission standard, which is usually reduced to only a few centimetres and even in the laboratory is restricted to a few metres, a high degree of security is ensured because the signals can be received by apparatuses that are paired with one another via NFC only in the immediate proximity. For this reason, undesired interference from more installations or parts of installations situated further away is also virtually excluded.

Of course, depending upon the configuration of the interface and communication connection, it is also possible to transmit signals by means of all other known, wireless transmission standards, such as, for example, Bluetooth or a wireless local area network (WLAN) that all permit a large range and a high data rate in relation to the signals to be transmitted. Further possible ways of transmitting signals would include mobile radio standards, such as Universal Mobile Telecommunications System (UMTS) or Long Term Evolution (LTE) along with the extension of Long Term Evolution Advanced (LTE Advanced), which also all permit access to the Internet and mobile radio network. It is also feasible to use transmission standards that are based on line of sight and in which electromagnetic waves are transmitted and received. By way of example, this includes the standard of Infrared Data Association (IrDA) which has already been known for a long time, and which offers a high level of security and at the same time a high data rate for optical, wireless point-to-point data transmissions by means of infrared light.

In relation to the first interface or communication connection provided for transmitting signals between the control switch and the control unit, it is considered to be advantageous if it is designed for transmitting signals by means of a serial bus system, such as, for example, a so-called controller area network, or CAN for short. In this regard, it is also possible to use another field bus system, which is suitable for industrial applications. This applies irrespective of a wireless, e.g. radio-based or wired type of transmission. Data that can be communicated this way can be transmitted, wherein in particular wired systems manage with a minimum amount of cable harnesses.

The invention is also directed to a control system that is provided for operating a crane. In this regard, the control system can also be referred to as crane control system. The control system in accordance with the invention comprises a switch as well as a mobile device. In a particularly preferred manner, the control switch can be the inventive control switch described in greater detail above. The mobile device of the control system in accordance with the invention can be connected to the control switch via the second interface and the associated communication connection for the purpose of transmitting signals. The devices consisting of the control switch and mobile device, which can thus be coupled together in terms of transmitting signals, permit an extremely advantageous extension of the functional scope of the control switch, which is otherwise determined by reason of the arrangement and function of its physically present operating elements that can be actuated mechanically.

It is thus possible that the control switch and/or the mobile device, which is connected to the control switch in a signal-transmitting manner via the second interface and the associated communication connection, are connected to the control unit in a signal-transmitting manner via the first interface and the associated communication connection. In other words, the control system can be connected to the control unit of the crane in this manner, preferably exclusively via the first interface, wherein the signal-transmitting connection between the mobile device and the control unit is established exclusively with quasi interpositioning of the control switch, and thus via the control switch. Both the mobile device and the control switch thus can or must use the first interface and the associated communication connection between the control switch and the control unit for the purpose of transmitting signals.

Significant advantages have already been previously stated in greater detail in connection with the control switch in accordance with the invention and so to avoid repetition reference is made to the statements in this respect.

The present invention basically makes provision for the mobile device to be a tablet computer and/or a smartphone. Of course, it is also feasible to use other mobile devices that are not detailed here and which have the known functional scope of tablet computers and/or smartphones, and are thus suitable for complementing the control switch. The advantage of using a tablet computer and/or a smartphone is in the at least intuitive use and plurality of interfaces occasionally present.

Furthermore, the invention includes a method used for operating a crane comprising a control system in accordance with aspects of the invention as previously described. A control switch, which is connected to the control unit of a crane in a signal-transmitting manner, is connected to a mobile device in a signal-transmitting manner, such that the functional scope of the control switch that is substantially static because it is physically fixed is extended by, in particular software-based, functions of the mobile device. The resulting advantages have already been presented in greater detail in connection with the inventive control switch and control system and so to avoid repetition reference is made to the corresponding statements in this respect.

According to another development of the method in accordance with the invention, current operating data of the crane are read out and/or parameters of the crane are adjusted by means of the mobile device connected to the control switch. In particular, for the transmission of signals that takes place in this respect, the first interface and the communication connection between the control switch and the control unit is used.

The programs that are used for extending function and that run on the mobile device can be transmitted to the device, e.g. from a physical data carrier. In a particularly preferred manner, these programs can also be made available as a download. For this purpose, a region of a network that can be reached with access data can be used, wherein the network can be an intranet or the Internet. In an advantageous manner, the application software required in each case can be made available in established download portals and can be downloaded onto the mobile device such as in the form of application software referred to as an app. The functional scope can thus be continuously extended and improved or increased by means of parallel and future further developments, without requiring the mandatory replacement of hardware, in particular the crane control switch.

These and other objects, advantages and features of the invention will become apparent upon review of the following specification in conjunction with the drawings.

BRIEF DESCRIPTION OF THE DRAWINGS

FIG. 2 shows a schematic view of a control system of the crane of FIG. 1.

DESCRIPTION OF THE PREFERRED EMBODIMENTS

Figure 1:
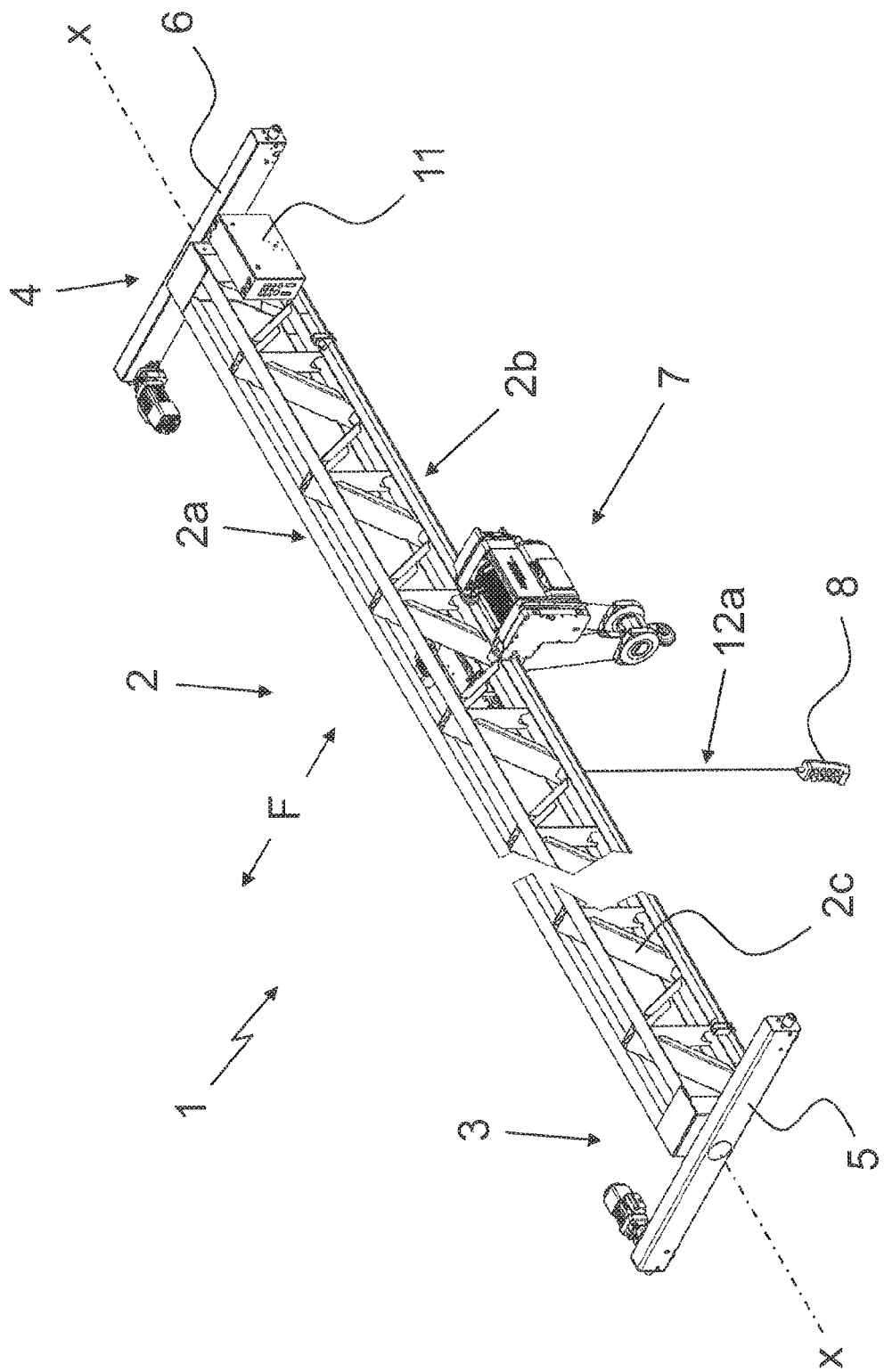
FIG. 1 shows a perspective view of a crane in accordance with the invention.

FIG. 1 shows a perspective view of an exemplified structure of a crane 1 in accordance with the invention. It can be seen that the crane 1 is designed as an overhead travelling crane in the form of a single-girder bridge crane that has a crane girder 2 mounted so as to be movable along a craneway, not illustrated. The crane girder 2 is formed as a lattice girder that has a top chord 2a and a bottom chord 2b as well as lattice struts 2c extending between the top chord and bottom chord 2a, 2b.

The crane girder 2 can be moved in a motorised manner in a substantially horizontal travel direction F transversely to its longitudinal direction x. For this purpose, a running gear unit 5, 6 is arranged in each case at the opposite ends 3, 4 of the crane girder 2, each running gear unit each being supported on, in each case, a crane rail of the craneway not shown in greater detail here. Arranged on the crane girder 2, in particular on its bottom chord 2b is a crane trolley 7 having a lifting mechanism, which can be moved together with the lifting mechanism in a motorised manner along the crane girder 2 in parallel with the longitudinal direction x of the crane girder 2. The operation of the crane 1, i.e. in particular the activation of movements and functions of the running gear units 5, 6 of the crane trolley 7 and the drive thereof and the lifting mechanism is effected via a control switch 8 that, in the present case, is designed as a pendant control switch connected by cables.

FIG. 2 shows a schematic view of a control system 9 in accordance with an embodiment of the invention that comprises a mobile device 10 in addition to the control switch 8. The crane 1, which is likewise only schematically shown, also has a control unit 11 that is connected via a communication connection 12a, which serves in particular as a control line, between the control unit 11 and the control switch 8. For this purpose, the control switch 8 has a first interface 12 that is designed for transmitting signals in a wired manner between the control unit 11 and the control switch 8 by means of the communication connection 12a. Alternatively, it is also feasible to have an interface 12 for transmitting signals wirelessly, where the associated communication connection 12a or control line is then wireless accordingly.

Irrespective of the specific configuration, signals are transmitted between the control unit 11 and control switch 8 such as by means of a serial bus system or field bus system.

It is apparent that the control switch 8 has a plurality of conventional, physical operating elements 8a, which are to be actuated mechanically, in the form of buttons, in particular push-buttons and/or switches, whereas the mobile device 10 includes primarily an operating panel in the form of a touchscreen 10 with a touch-sensitive surface. The operating panel or its touch-sensitive surface can also be operated with a suitable stylus, depending upon the technology used, if the operator is wearing gloves to which the touch-sensitive surface is not responsive. The control switch 8 and thus also the control system 9 has a second interface 13, which is provided for transmitting signals via a communication connection 13a between the mobile device 10 and the control switch 8. The second interface 13 and the associated communication connection 13a may be designed for transmitting signals wirelessly that, in the present case, is effected by means of NFC. In this manner, the control switch 8 and the mobile device 10 enter into communication with one another via the communication connection 13a only within an effective range that is reduced to a few centimetres, and so the local coupling thereof requires corresponding spatial proximity. The established range restriction of the communication connection 13a increases the security of this connection because external access is virtually excluded. Moreover, when using security-relevant functions additional security is achieved via the mobile device 10. For example, in the event of spatial separation extending beyond the effective range of the communication connection 13a, the communication connection 13a between the device 10 and the control switch 8 automatically breaks off, i.e. is interrupted. In the specific embodiment, the control switch 8 can have for this purpose at least one NFC antenna that allows the mobile device 10 to access the control switch 8.

Of course, the communication connection 13a between the mobile device 10 and the control switch 8 can also be provided in wired form. The second interface 13 is then designed accordingly. This also includes the possibility of a plug connection between the mobile device 10 and the control switch 8 that, in particular, permits direct mechanical coupling such as via at least one pluggable means.

The mobile device 10 can be, for example, a tablet computer and/or a smartphone. In practice, the control switch 8 connected to the control unit 11 of the crane 1 can be connected to the mobile device 10 in a signal-transmitting manner as required via its second interface 13 and the communication connection 13a. In this case, the crane 1 can have an individual identifier that allows the communication connection 13a between the mobile device 10 and the control switch 8 to be established or used. For example, the crane 1 or its control switch 8 can have an individual Quick Response (QR) code that is detected and evaluated via an image sensor of the mobile device 10 not shown in greater detail here. As a result, it is possible to recognise information essential for the connection, on the basis of which the actual coupling is then effected via the communication connection 13a or on the basis of which the communication connection 13a is enabled and only subsequently can be used. The storage of several kilobytes possible with such a QR code is sufficient for communicating the transfer values required for parameterising the crane 1.

The successful coupling with the mobile device 10 means that the functional scope of the control switch 8 can be extended in particular by software-based functions of the mobile device 10. For this purpose, when connecting the mobile device 10 and the control switch 8, suitable application software that is also referred to as an app can be launched on the mobile device 10. Alternatively or in addition thereto, such an app can initially be downloaded by the mobile device 10 such as from a server on the intranet or the Internet, then it can be installed and subsequently launched. The transmission of signals required for this purpose can be effected, for example, via a mobile radio standard of the mobile device 10. Such an app can also be used as an interface of the control system 9 to the Internet in order to have, for example, circuit diagrams and help pages and specific replacement parts for the respective crane 1 displayed, resulting in a direct online facility for ordering such replacement parts. Furthermore, such an app can function as a service tool that reads out and analyses information relating to any operating data of the crane 1 and possible error messages from the control unit 11.

Embodiments of the invention thus allow functions extending beyond standard functions for primary operation of the crane 1, in particular complex functions, to be swapped out onto the mobile device 10. Standard functions are, for example, effecting crane travel along a craneway performed by means of the running gear units 5, 6, effecting travel of the crane trolley 7 along the crane girder 2, or effecting lifting/lowering of a load picking-up apparatus with or without a load, by means of the lifting mechanism. It is also feasible that the standard functions for primary operation can be used via the mobile device 10 and in particular the corresponding movements of the crane 1 can be triggered and so in this respect redundancy with respect to the operating elements 8a of the control switch 8 is feasible. Complex functions can be, for example, error analysis and error correction by integration of the service facility, as described hereinafter. The communication between the mobile device 10 and the control switch 8 allows not only the pure reading-out, such as of current operating data of the crane 1 from the control unit 11, but also specific measures, such as for instance the adjustment of parameters for any error correction or function change and/or function extension. By way of example, possible parameters can be crane axle speeds, crane axle accelerations, oscillation damping values and diverse security functions and functions of the digital control outputs or types of operation.

In practice, e.g. in the event that an error occurs which causes the crane 1 to stop operating, the mobile device 10 can be connected to the control switch 8 via the second interface 13 and the communication connection 13a. In this manner, information relating to the error can be transmitted to the mobile device 10 and displayed accordingly. Subsequently or at the same time, stored information can be displayed that provides assistance for removing the cause of the error that has occurred, for example. Furthermore, contact to a service facility can be displayed or directly established if required. Current data can be interrogated by and/or communicated to the service facility via a transmission standard of the mobile device 10 and so the service facility can initially provide, for example, an external assistance point without actually being on site. It is also possible to effect an adjustment for an emergency operation of the crane 1 that, as a short-term solution, permits the further use of the crane 1 until an engineer definitively solves the problem on site.

In particular, the integration of a touchscreen into the control switch 8 or its housing can thus be avoided and so the robustness of the control switch 8 is retained while the functional scope or functionality can be extended, as described above.

Of course, the present invention is also feasible in relation to different embodiments of crane 1 that are not shown in greater detail here. For instance, it can be alternatively designed, for example, as a single-girder wall-mounted crane that then has a freely cantilevered crane jib 2. The design as a dual-girder bridge crane or as a dual-girder gantry crane that then each includes two corresponding crane girders 2, is also feasible.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A control system for operating a crane, said control system comprising:
   a mobile device comprising a tablet computer or a smartphone;
   a control switch for operating primary functions the crane including lifting and lowering of a load picking-up apparatus of the crane, wherein the control switch comprises:
      (i) a first interface configured for transmitting signals between the control switch and a control unit of the crane; and
      (ii) a second interface configured for transmitting signals between the mobile device and the control switch;
   wherein the mobile device is connected to the control unit in a signal-transmitting manner during operability of the crane via the second interface, the control switch, and the first interface; and
   wherein functions of the mobile device are operable to extend the functional scope of the control switch beyond the primary functions of the crane, the extended functional scope including at least one chosen from:
   i) retrieving instructions stored in a database;
   ii) interfacing with the Internet to display circuit diagrams, help pages, and replacement parts for the crane, and to provide ordering capability for the replacement parts; and
   iii) adjustment of parameters including types of crane operation.

2. The control system as claimed in claim 1, wherein the first interface is configured for transmitting signals in a wired manner and the second interface is configured for transmitting signals wirelessly.

3. The control system as claimed in claim 1, wherein the second interface is configured for transmitting signals between the mobile device and the control switch by near field communication (NFC).

4. The control system as claimed in claim 1, wherein the first interface is configured for transmitting signals between the control switch and the control unit by a serial bus system (CAN).

5. The control system of claim 1, further in combination with a crane.

6. A method for operating a crane comprising a control system as claimed in claim 1, said method comprising connecting a control switch that is connected to a control unit of the crane in a signal-transmitting manner to a mobile device in a signal-transmitting manner, wherein the functional scope of the control switch is extended by software-based functions of the mobile device.

7. The method as claimed in claim 6, further comprising reading out or adjusting current operating data or parameters of the crane by the mobile device.

8. The control system as claimed in claim 2, wherein the second interface is configured for transmitting signals between the mobile device and the control switch by near field communication (NFC).

9. The control system as claimed in claim 8, wherein the first interface is configured for transmitting signals between the control switch and the control unit by a serial bus system (CAN).

10. The control system of claim 9, further in combination with a crane.

11. The control system as claimed in claim 2, wherein the first interface is configured for transmitting signals between the control switch and the control unit by a serial bus system (CAN).

12. The control system of claim 2, further in combination with a crane.

13. The control system as claimed in claim 3, wherein the first interface is configured for transmitting signals between the control switch and the control unit by a serial bus system (CAN).

14. The control system of claim 3, further in combination with a crane.

15. The control system of claim 4, further in combination with a crane.

16. The control system of claim 1, wherein the mobile device is operable to control the primary functions the crane including lifting and lowering of the load picking-up apparatus.

\* \* \* \* \*